(No Model.) 10 Sheets—Sheet 1.

C. W. & T. B. KEIGHLEY & W. NETHERWOOD.
MACHINE FOR CUTTING THE PILE OF WEFT PILE FABRICS.

No. 462,356. Patented Nov. 3, 1891.

WITNESSES:
C. J. Belt.
Walter Allen

INVENTORS:
C. W. Keighley,
T. B. Keighley, and
Wm. Netherwood.
by Herbert W. T. Jenner.
Attorney.

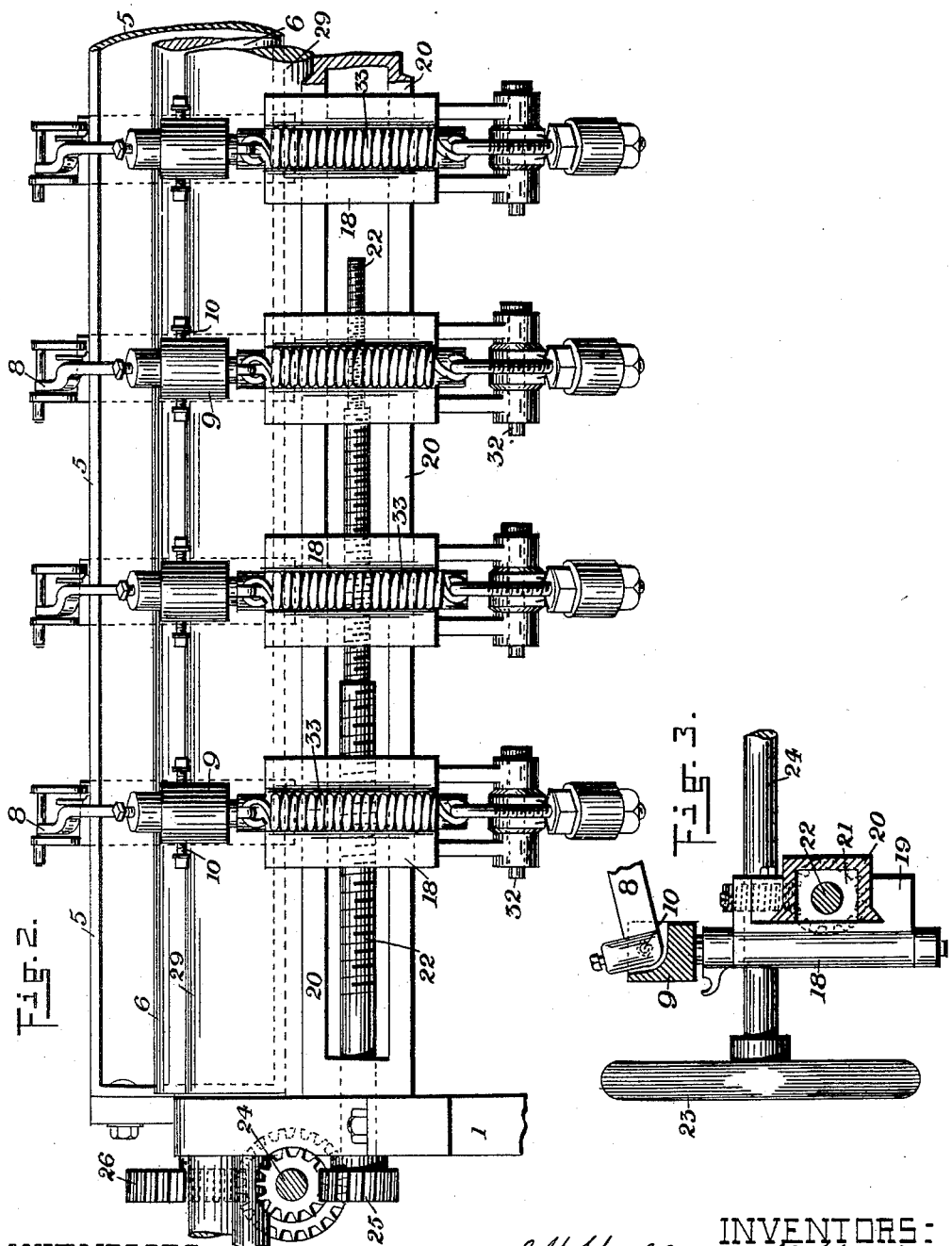

(No Model.) 10 Sheets—Sheet 3.
C. W. & T. B. KEIGHLEY & W. NETHERWOOD.
MACHINE FOR CUTTING THE PILE OF WEFT PILE FABRICS.
No. 462,356. Patented Nov. 3, 1891.
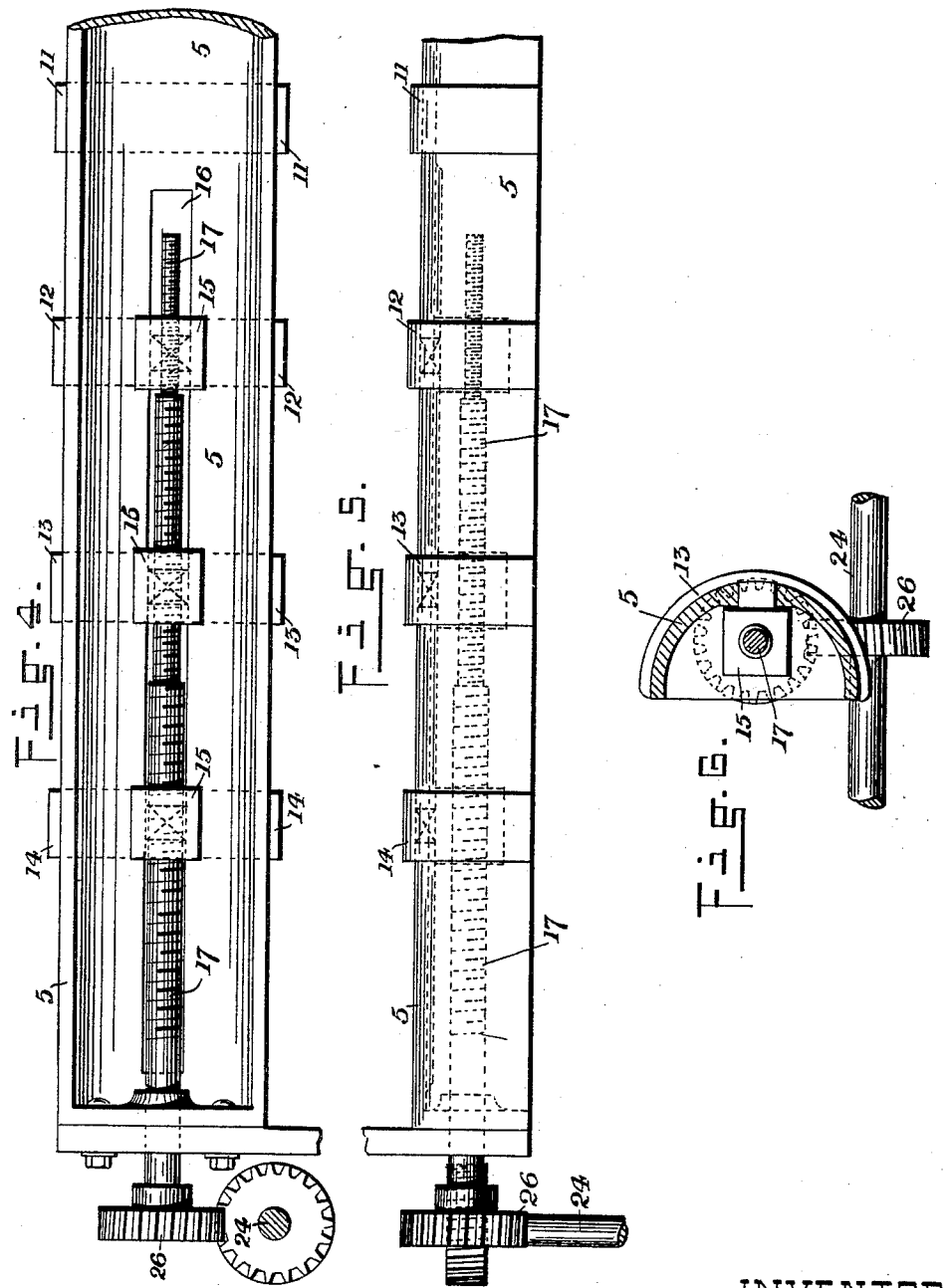
WITNESSES:
C. T. Belt
Walter Allen
INVENTORS:
C. W. Keighley, T. B. Keighley,
and Wm Netherwood
by Herbert W. T. Jenner, Attorney.

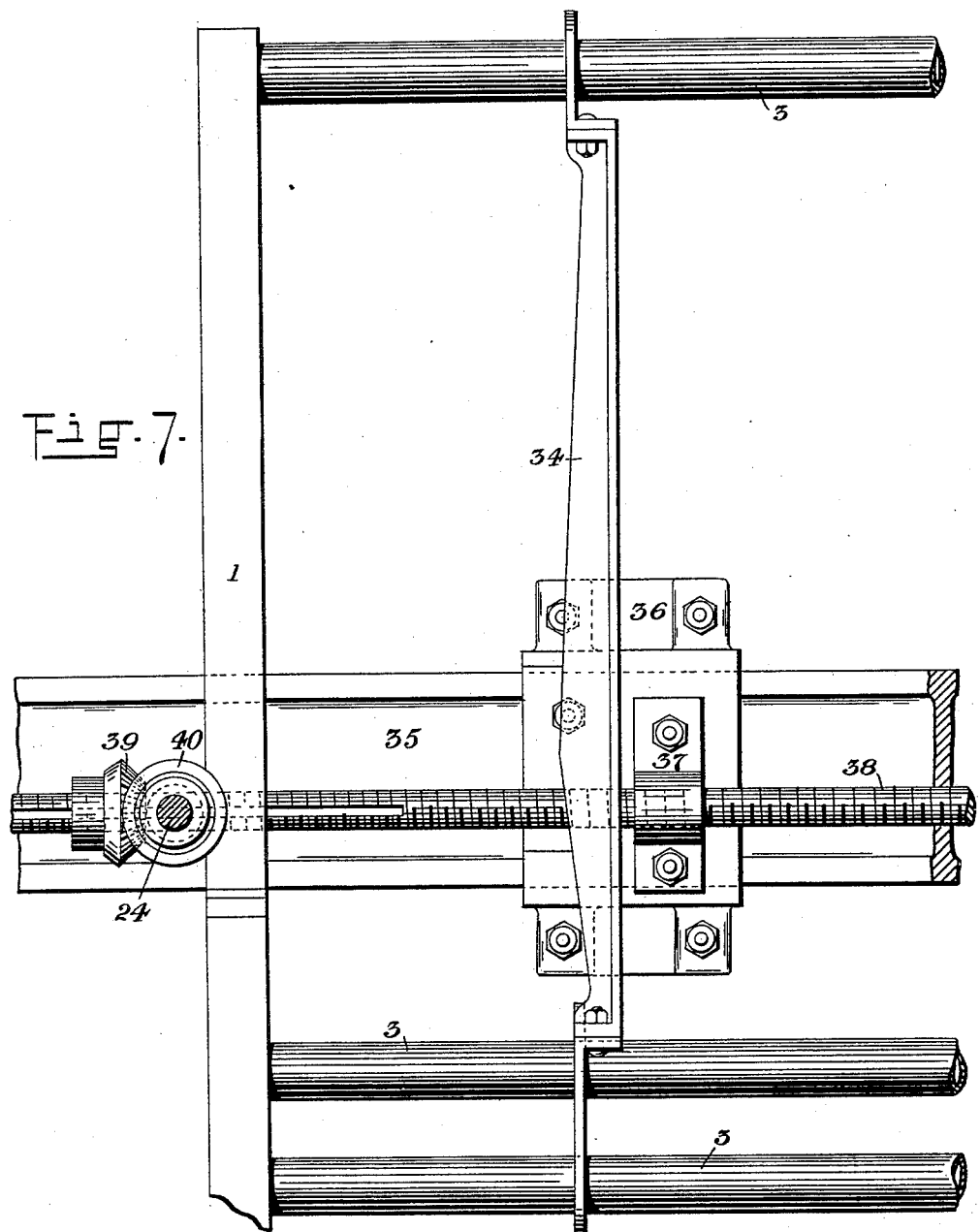

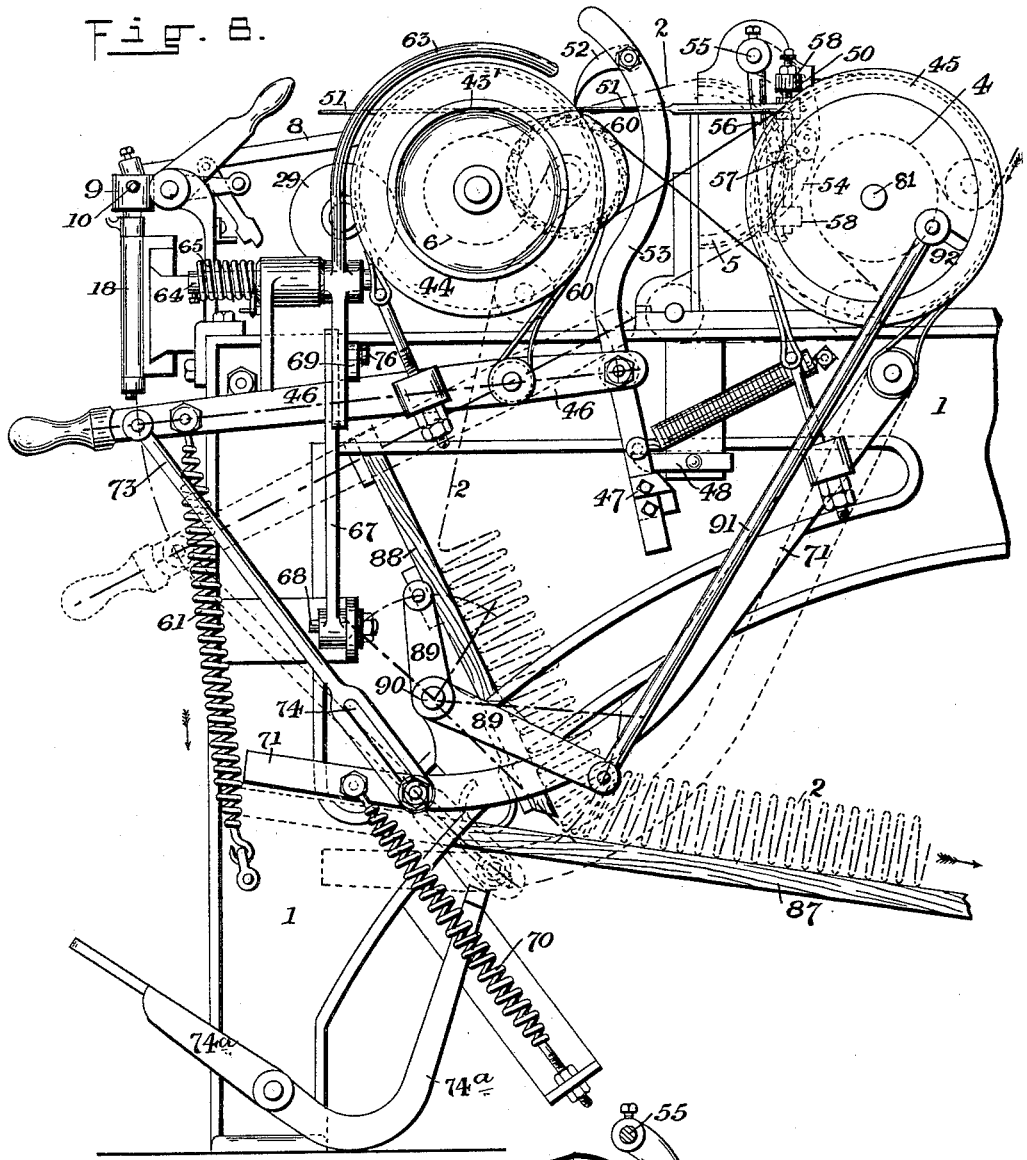

(No Model.) 10 Sheets—Sheet 6.

C. W. & T. B. KEIGHLEY & W. NETHERWOOD.
MACHINE FOR CUTTING THE PILE OF WEFT PILE FABRICS.

No. 462,356. Patented Nov. 3, 1891.

Fig. 9.

WITNESSES:
C. T. Beer
Walter Allen

INVENTORS:
C. W. Keighley, T. B. Keighley,
and Wm. Netherwood.
by Herbert W. T. Jenner. Attorney.

(No Model.) 10 Sheets—Sheet 7.
C. W. & T. B. KEIGHLEY & W. NETHERWOOD.
MACHINE FOR CUTTING THE PILE OF WEFT PILE FABRICS.
No. 462,356. Patented Nov. 3, 1891.
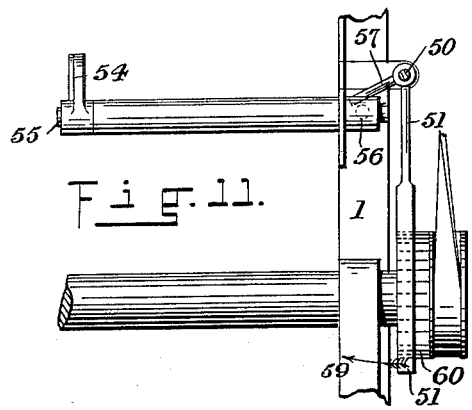
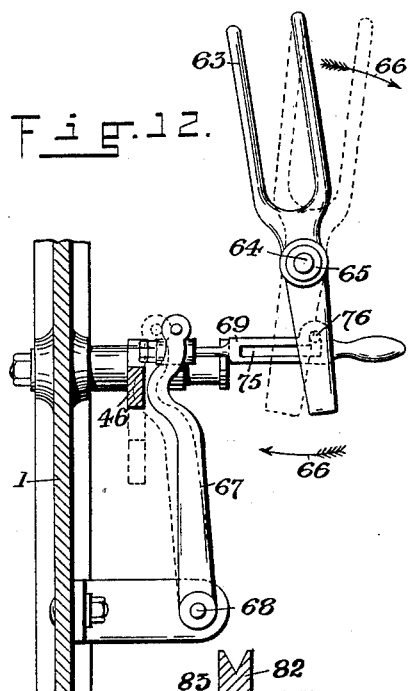
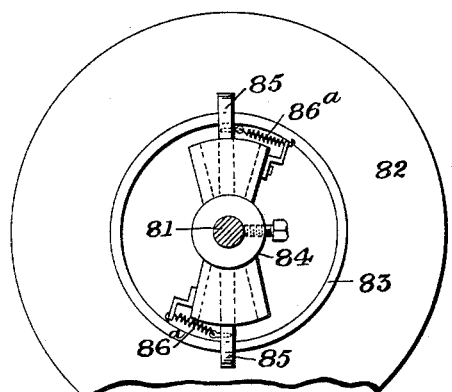
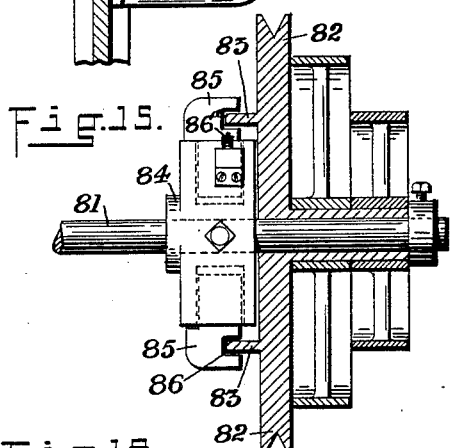
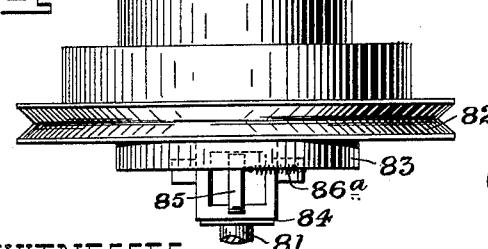
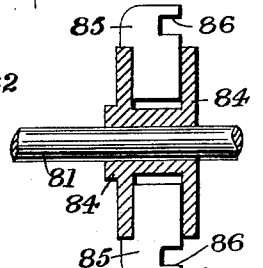
WITNESSES:
INVENTORS:

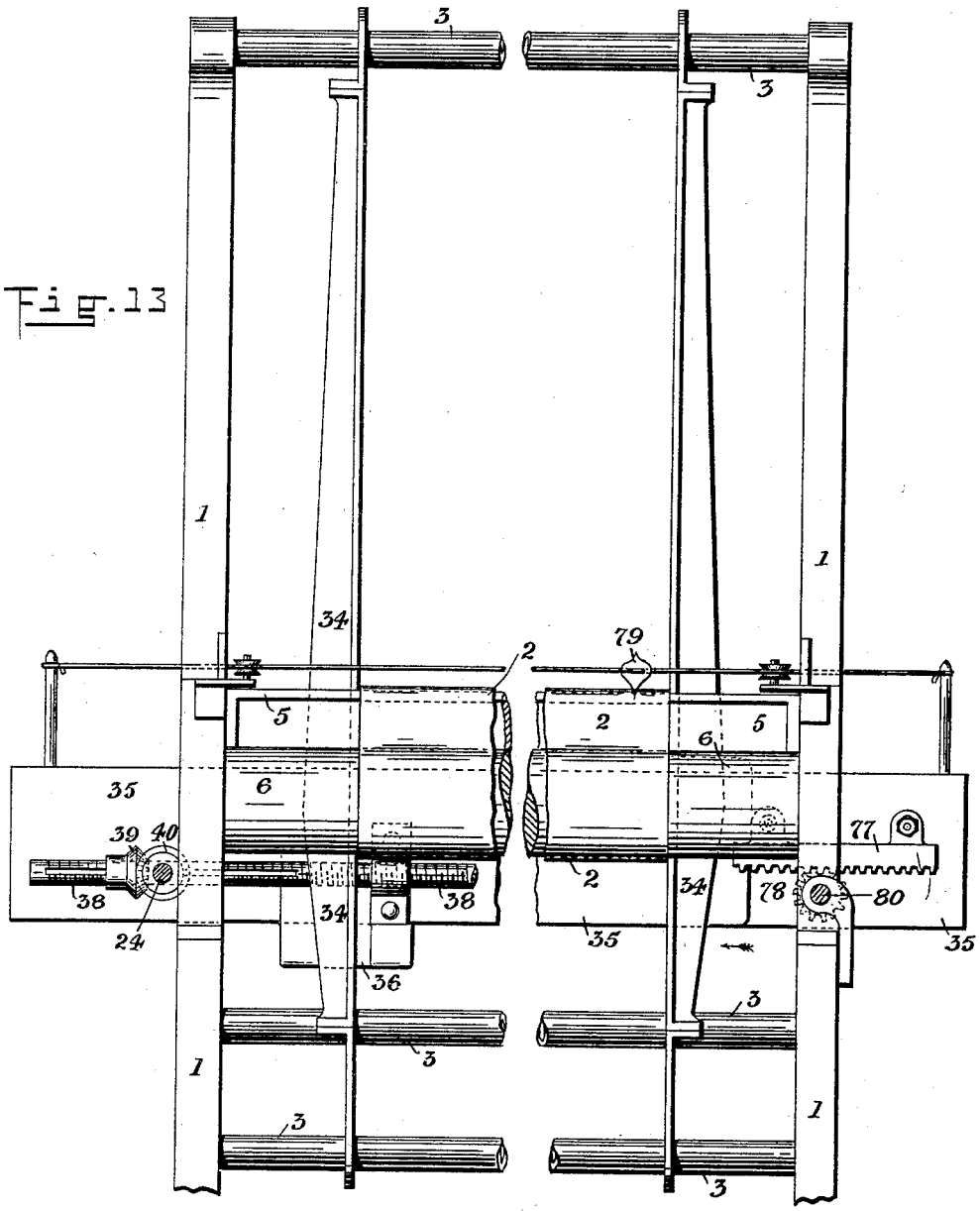

(No Model.) 10 Sheets—Sheet 9.
C. W. & T. B. KEIGHLEY & W. NETHERWOOD.
MACHINE FOR CUTTING THE PILE OF WEFT PILE FABRICS.

No. 462,356. Patented Nov. 3, 1891.

WITNESSES:
C. T. Belt
Walter Allen

INVENTORS:
C. W. Keighley, T. B. Keighley,
and Wm. Netherwood.
by Herbert W. Jenner. Attorney.

(No Model.) 10 Sheets—Sheet 10.
C. W. & T. B. KEIGHLEY & W. NETHERWOOD.
MACHINE FOR CUTTING THE PILE OF WEFT PILE FABRICS.
No. 462,356. Patented Nov. 3, 1891.
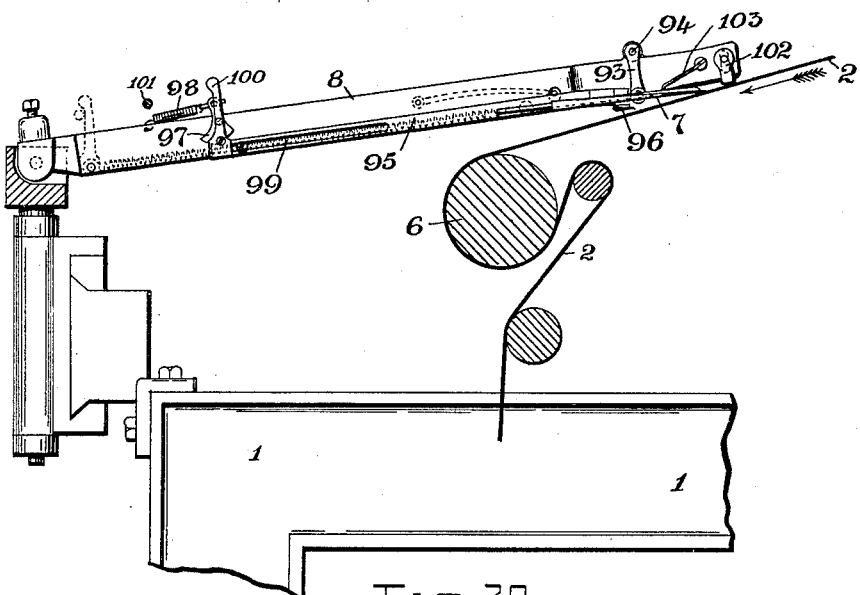
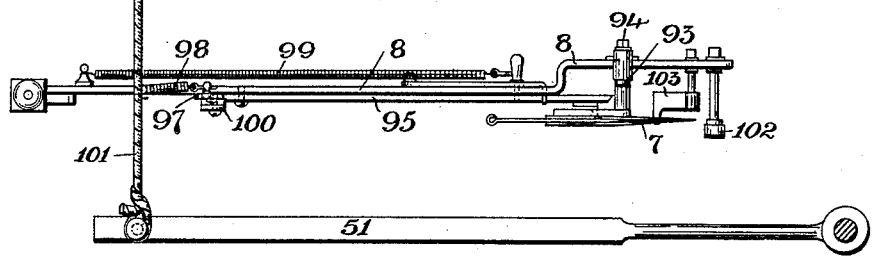
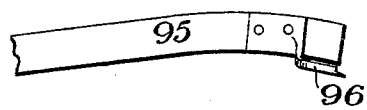
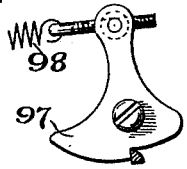
WITNESSES:
C. J. Belt
Walter Allen
INVENTORS:
C. W. Keighley, T. B. Keighley,
and Wm. Netherwood.
by Herbert W. T. Jenner, Attorney.

UNITED STATES PATENT OFFICE.

CHARLES WILLIAM KEIGHLEY, THOMAS BURNUP KEIGHLEY, AND WILLIAM NETHERWOOD, OF HUDDERSFIELD, ENGLAND.

MACHINE FOR CUTTING THE PILE OF WEFT PILE FABRICS.

SPECIFICATION forming part of Letters Patent No. 462,356, dated November 3, 1891.

Application filed May 11, 1891. Serial No. 392,327. (No model.)

*To all whom it may concern:*

Be it known that we, CHARLES WILLIAM KEIGHLEY, THOMAS BURNUP KEIGHLEY, and WILLIAM NETHERWOOD, citizens of Great Britain, residing at Huddersfield, in the county of York, England, have invented certain new and useful Improvements in Machines for Cutting the Pile of Weft Pile Fabrics; and we do hereby declare the following to be a full, clear, and exact description of the invention, such as will enable others skilled in the art to which it appertains to make and use the same.

Our invention has reference to self-acting machinery employed in cutting the pile of parallel-corded fabrics and velvets, our improvements in such machinery consisting in the novel construction and combinations of the parts hereinafter fully described and claimed.

Figure 1:
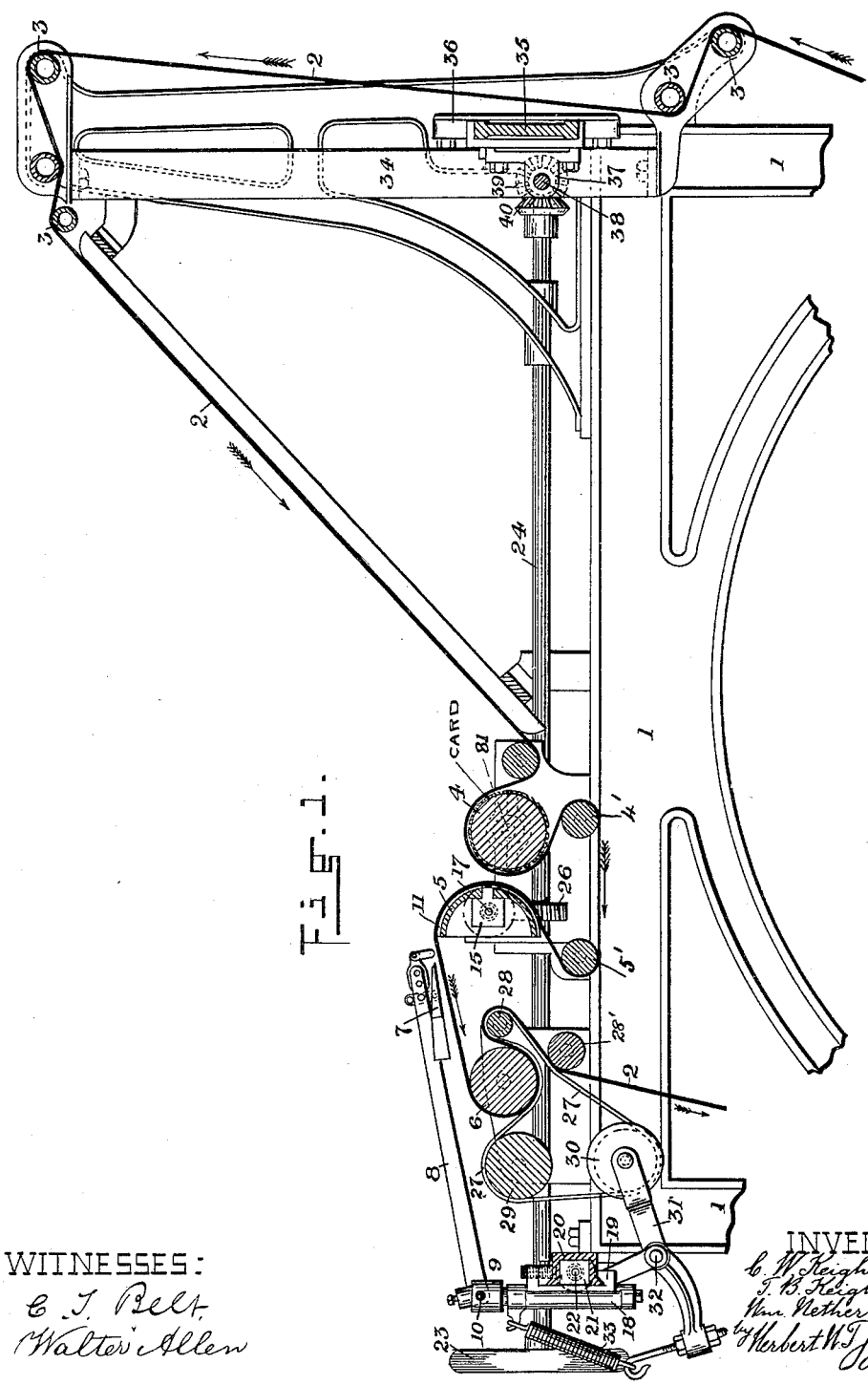
Figure 17:
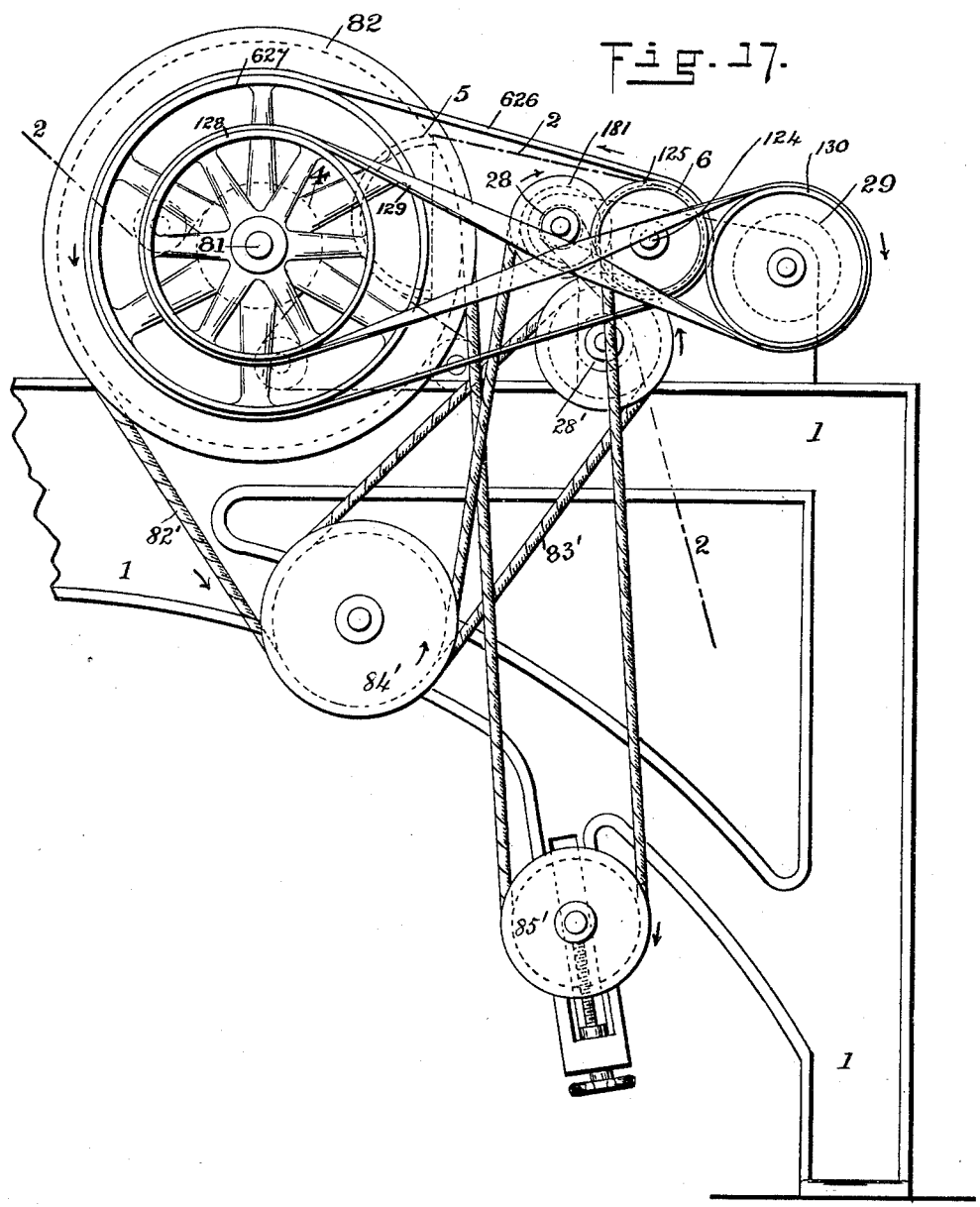

In the drawings, Figure 1 is a sectional elevation of the machine. Fig. 2 is a front view of a portion of the same. Fig. 3 is a sectional elevation of a portion of the same. Figs. 4, 5, and 6 are respectively an elevation, plan, and cross-section of the back rail 5 and co-operating parts. Fig. 7 is a detail view of one of the brackets 34 and the mechanism for operating it. Fig. 8 is a front view of the devices for stopping the machine, and Fig. 9 is an end view of the same. Fig. 10 is a cross-section through the back rail, showing the arm 54. Figs. 11 and 12 show details of the belt-shifting devices. Fig. 13 is a detail front view of the devices for moving the cut fabric laterally. Figs. 14, 15, 16, and 18 are details of the wheel 82 and its connections. Fig. 17 is an end view showing how the various rollers of the machine are driven. Figs. 19, 20, 21, and 22 are respectively a front elevation, plan, and detail views of the cutting apparatus.

In order that the nature and object of our improvements may be more fully understood, we will now proceed to describe the same with reference to the accompanying sheets of drawings, wherein—

Fig. 1 is a sectional elevation of our improved machine; and Fig. 2 is a front view of Fig. 1, on an enlarged scale, illustrative of the first three parts of our invention.

1 represents the frame-work of the machine, and 2 the endless traveling fabric passing over guide-rollers 3 at the feeding end of the machine. The said fabric also passes over a card-covered roller 4, over the guide-rollers 4' and 5', and around the back rail 5 and over the taking-in or tension roller 6, and finally back again to the feeding end of the machine, the said endless fabric making a continuous circuit.

The pile-cutting knife is represented at 7, and it is connected to and supported by the radial arm 8, of which there are four in this machine; but one or more may be used, as desired. Each radial arm rests in a socket 9, (see Fig. 3,) which is an enlarged section of the parts shown at the left hand of Fig. 1, such radial arm being kept in position by set-screws 10, which permit of the said radial arms moving up and down for removing the knife and for other purposes.

One part of our invention consists in causing those portions of the fabric where the knives are cutting to be in a greater state of tension than the parts between the knives, and this we accomplish by placing narrow plates or swells 11, 12, 13, and 14 over the back rail 5. (Shown more clearly in enlarged elevation, Fig. 4, plan view, Fig. 5, and cross-section, Fig. 6.) Each of the plates 12 13 14 is connected to or formed with bosses or nuts 15, the shank of which enters a longitudinal slot 16, formed in the back rail 5, (see Fig. 4,) to permit endwise movement of the plates, and each nut 15 receives a screw 17 of different pitches, for purposes hereinafter explained. A cutting-knife occupies a position opposite each plate 11 12 13 14, and it is obvious that when the fabric is traveling over the said plates the tension on the fabric will be greater on the plates than at the portions of the fabric lying between the plates. Consequently the knives can more effectually do their work. As the fabric contracts in width by being stretched and by the cutting of the cord, it is requisite for the cutting-knives to be capable of being moved laterally to suit the narrowed or altered conditions of the fabric. It is therefore necessary to provide means for adjusting the said knives with regard to the fabric, and this we effect in conjunction with the lateral or endwise movement of the plates 12 13 14. To do this the bracket 18 (on the top of which is the radial arm 8) is made with side pieces 19, and is supported upon the slide or bed 20. A nut 21 is also connected to the bracket 18, such nut working upon a screw 22 of different pitch corresponding with the screw 17, employed to traverse the plates 12 13 14. The two screws 17 and 22 are made to revolve by the operative turning hand-wheel 23 on cross-shaft 24, which has fixed upon it worm-wheels gearing into the worms 25 and 26, secured on the shafts of the screws 17 and 22, respectively, whereby the plates 12 13 14 and brackets 18, together with the radial arms 8 and knives 7, are moved laterally and in unison.

In combination with each plate 11 12 13 14 we employ narrow belts 27, which belts pass over driving-rollers 28 and 29 and under the taking-in or tension roller 6. The fabric 2 travels partially around the said taking-in roller 6, which is made to revolve at a high speed, the fabric being pressed thereby against the endless belts or straps 27, which impart to the said fabric the tension necessary to enable it to pass through the machine in a straight and uniform manner. As each belt 27 is arranged opposite or in a line with each plate 11 12 13 14, and also with each knife 7, it is also necessary for the said belts to move laterally in conjunction with the said plates and cutting-knives, and this is performed as follows, viz: The tension of the endless belts 27 is regulated by the tension-pulleys 30, carried on the end of the levers 31, hinged by pins 32 to the bottom of the brackets 18, the tension-pulleys 30 being drawn downward by the upward pull of the spiral springs 33, and as the tension-pulleys 30 have flanges upon them with the belts between them it follows that the said endless belts will be traversed laterally when the brackets 18 are made to travel by the screw 22.

It will be seen that the nuts 15, connected to the plates 12 13 14, and the nuts 21, connected to brackets 18, are upon screws of different sizes and pitches, and this is required for the following reasons, namely: The end plate 11, with its corresponding knife, is stationary and has no sidewise movement; but as the fabric passes through the machine it gradually shrinks in width by reason of the cutting and stretching. Therefore it is necessary for the plates 12 13 14 and their corresponding knives and belts to be traversed toward the stationary plate 11 with its knife and belt. Therefore if the plate 12, together with its knife and belt, requires to advance toward the plate 11, say, one-eighth of an inch, it follows that the plate 13 must move one-fourth of an inch, or double the distance, and that plate 14 must move three-eighths of an inch, or three times the distance. The screws are therefore made of the necessary size and pitch to perform these operations.

In conjunction, therefore, with the lateral movement of the plates 12 13 and 14 knives 7 and parts connected therewith, it is also necessary for the flanges or guides at the feeding end of the machine to be traversed laterally and at the same time, but in a larger proportion than the plates and belts, to provide for the narrowed condition of the fabric produced by stretching and the cutting of the cords, and these various movements we effect in the following manner: At the feeding end of the machine are two brackets 34, (see Figs. 1 and 7,) one of such brackets (not shown) being fixed to the cross-rail 35, which is also capable of lateral movement, and the other bracket, which is shown, having lateral movement upon the said rail 35. The moving bracket or guide-plate 34 is connected to a saddle 36, supported by the cross-rail 35. The saddle is provided with a nut 37 capable of working on the screw 38, such said screw being operated by a pair of bevel-wheels 39 and 40, the latter of which is fixed on the end of the shaft 24, so that when the operative turns the hand-wheel 23 the plates and knives, together with the endless belts 27 and flanged bracket or guide-plate 34, are each and all together moved laterally to suit the altered or narrowed condition of the fabric, as already stated, but not in the same proportion, as the pitch of the screw 38 is made rather coarser than the coarsest pitch of the screws 17 and 22, so that the guide-plate 34 moves rather quicker than the plate 14 and its accompanying belt and knife.

Notwithstanding that more than one knife is referred to as being used in this machine, we would observe that, if required, only one knife need be used, and when cutting velvets it may be advantageous for the operative or operatives to hold the knife or knives with the hand, in which case the cutting-arms 8 would be dispensed with and in addition the screws 17 and 22 be of one pitch.

Another part of our invention relates to an apparatus for automatically stopping the machine every time the fabric has passed through it. This part of our invention is illustrated in Fig. 8, which is a front view of the machine, and Fig. 9 an end view of the same. The taking-in or tension roller 6 is mounted in suitable bearings and driven positively by a strap 42, passing over driving-pulleys 43, while the card-covered roller 4 is driven by the pull of the fabric. On the shafts of both the taking-in roller 6 and the card-roller 4 are brake-pulleys 44 and 45, brought into operation, as hereinafter described, by the release of the lever 46, which is kept in its position, as shown in the drawings, by the catch 47 bearing underneath the lip or latch 48. The extreme ends of the fabric which is being cut are joined together and made endless, as shown at the thickened part 49 in Fig. 10, which is a detail drawing. On the vertical spindle 50 there is fixed a horizontal arm 51, upon which arm is resting a pawl or catch 52, carried on the upper end of the lever 53. Therefore when the thickened part 49 (which represents the end of the fabric having been cut) passes under the cranked arm 54 the latter is raised thereby, causing the axle 55 to oscillate or rock in such a manner as to force the vertical finger 56 against the horizontal pin 57, attached to the vertical spindle 50, which is made to oscillate in its bearings 58, so as to cause the horizontal arm 51 (shown in Figs. 8 and 11) to be moved sidewise in the direction of the arrow 59, (see Fig. 11,) whereby it discontinues to support the extreme end of the pawl 52, which consequently descends or drops into the teeth of the revolving catch-wheel 60, which said revolving catch-wheel forces the pawl 52 and with it the lever 53 backward, in doing which the catch 47 is taken from underneath the latch 48, whereby the spiral spring 61 draws the lever 46 downward, as shown in dotted lines in Fig. 8. Consequently the brake 44 is applied, and simultaneously therewith the driving-strap 42 is moved from the fast pulley 43 to the loose pulley 43' and the machine is immediately stopped.

Having now described what happens when the horizontal rod 51 ceases to support the pawl 52, and how the lever 46 descends and the strap-fork moves the strap from the fast to the loose pulley, we will now describe how the strap-fork is operated. The said strap-fork 63 is capable of oscillating upon the stud 64, upon which stud is wound a coiled spring 65, the tendency of which is to operate the strap-fork in the direction of the arrow 66, Fig. 12, so as to move the strap from the fast pulley to the loose pulley; but when the machine is at work the stud 64 is prevented from being rotated by the coiled spring by means of one side of lever 46, (see Fig. 12,) pressing or acting against the bent portion of the upper end of lever-arm 67, which works upon a fulcrum 68, the upper end of the said arm 67 being connected to the strap-fork 63 by the short slotted bar 69; but when the horizontal rod 51 is moved sidewise, as explained, and the lever-arm 46 made to descend it is removed from contact with the bent portion of lever 67, whereupon the coiled spring 65, being released, suddenly revolves the stud 64, whereby the strap is transferred from the fast to the loose pulley. When the lever-arm 46 is elevated for the purpose of restarting the machine, as shown in full lines of the drawings, Fig. 8, it comes into contact again with the bent portion of the arm 67, forcing the arm 69 horizontally forward, so as to cause the stud 65 to oscillate in the reverse direction to make the strap-fork place the strap from the loose to the fast pulley.

The brake 45 on the end of the card-covered roller 4 is applied when the machine is being stopped by the thickened part 49 at the same time as the brake 44, and this is effected by means of the spiral spring 70 pulling down the bent lever 71; but the movement of the bent lever 71 can only take place when the lever 46 commences to lower, as the former is connected to the bent lever 71 by the connecting-rod 73.

We wish it to be understood that while the two brakes 44 and 45 are applied at one and the same time for the purpose of stopping the taking-in roller 6 and the card-covered roller 4 the pressures of the two brakes are not removed at exactly the same moment of time in consequence of the slot 74 at one end of the connecting-rod 73, because the bent lever 71 cannot commence to rise to release its brake 45 until the lever 46 has been raised a height equal to the length of the slot 74. Consequently the brake 45 is removed from the card-roller shaft 4 a little later on than the brake of the taking-in roller, and this forms an essential part of our invention, because in practice it is found that the fabric in close proximity to the cutting-knives is somewhat slackened every time the machine has been stopped, which slackness is injurious to the proper cutting. Therefore to take up the slack of the fabric at that part where the knives are cutting is essential, and this we perform by the brakes 44 and 45 being connected together by the slotted connecting-rod 73, which permits the former to act before the latter when restarting the machine. The brake 45 can, however, be released when required for the purpose of passing the thickened part 49 or a damaged part of the piece past the knives while the fabric is in a state of tension, and this is done by the attendant putting his foot upon the treadle 74ª, thereby raising the bent lever 71 and parts connected therewith.

For the purpose of releasing the brakes so as to permit the length of fabric to be slackened, as is sometimes necessary in order to examine the fabric, we form a rectangular slot 75 (see Fig. 12) in the horizontal plate 69, connected to the strap-fork, so that on the plate being raised, so as to place the stud 76, formed on the strap-fork, in a line with the horizontal portion of the slot, the said plate 69 and the devices attached to it can be moved back and forth without removing the strap from the loose pulley.

When the fabric has passed through the machine and has stopped automatically by the part 49 raising the lever 54, as already explained, it is necessary for the fabric to be moved laterally for the purpose of presenting other portions of uncut pile to the knives; and our improvements relate to means to be employed for this purpose, and it is performed by means of a rack 77 (see Fig. 13) and pinion 78. The rack is attached to the sliding rail 35 at the rear of the machine. The fabric 2 passes between two adjustable guides or plates 34, connected to the rail 35, so that when the pinion 78 operates the rack in the direction of the arrow marked thereon the rail 35 and the guides 34 are caused to advance in the same direction, carrying the fabric with them, and in order to assist the operative to move the fabric the correct distance required an index-finger 79 is employed, which indicates the extent of movement given to the fabric. The pinion 78 is fixed on the end of a shaft 80, extending from the back to the front of the machine, and is provided with a hand-wheel (of ordinary approved construction and not shown in the drawings) for the operative to turn each time the fabric has to be moved. When the fabric has been moved the proper distance, the lever 46 is raised and the strap put onto the fast pulley, so that the machine is set in motion and the cutting operation resumed.

On the end of the shaft 81, which carries the card or letting-in roller 4, is mounted a rim-wheel 82, (see Figs. 14, 15, 16, and 17,) which drives a cord 82', as seen in Fig. 17, which is an end view showing how the various rollers of the machine are driven. The roller 6 is mounted on the main driving-shaft 124, and this shaft has also a belt-pulley 125, secured on it and adapted to drive by an open belt 626 a belt-pulley 627, secured on the hub of the wheel 82. Another belt-pulley 128 on the hub of the wheel 82 drives the roller 29 by means of a crossed belt 129 and a belt-pulley 130. The roller 28 is provided with a cord-pulley 28' and driven by the cord 82', which passes around the wheels 82 84' and the tension-wheel 85'. The roller 28' is driven by the open cord 83' and the cord-wheels, as shown in Fig. 17. These precise means for driving the various rollers are not essential to the invention, as any approved driving mechanism may be used that will give the parts the required motion. The rim-wheel 82 is loose on the shaft 81, and it is provided on one side with an annular projecting flange 83; but there is fixed on the said shaft a boss 84, having opposing recesses for the reception in each recess of a gripping-plate 85. (Shown in section, Fig. 18.) These gripping-plates 85 are loose in their recesses and are free to move laterally therein. The said gripping-plates are also made with grooves or slots 86 for fitting onto the flange 83 of the rim-wheel 82, and as long as the fabric pulls the card-roller around at the required speed the grippers 85 remain inoperative; but if the pull of the fabric tends to cause the card-roller to overrun the grippers will bind against the flange and the speed of the said card-roller will be retarded thereby. The slots 86 fit the flange 83 loosely and the centrifugal force of the plates forces them outward and causes them to bear against the flange. The plates remain radial to the shaft as long as the speed of the card-roller and the flange is the same; but when the card-roller overruns the plates are tilted sidewise by frictional contact with the flange.

The spiral springs 86ª (shown in Fig. 14) are employed to hold the gripper 85 in their central position. The grippers remain in the central position as long as the shaft and the wheel 82 revolve at the same speed; but whenever the shaft runs faster than the said wheel the grippers are tilted over and caused to grip the flange 83.

Our improvements to the cutting mechanism are shown in Figs. 19 to 22. The arm 8 is pivoted, as hereinbefore described, and carries the knife 7, which is connected to it by the pivoted link 93, which is free to oscillate on the pivot 94. The arm 8 carries a horizontal sliding bar 95, and a pointed finger 96 is secured to the front end of this bar under the knife, as shown in Fig. 21. When the knife is cutting the fabric, the pointed finger 96 follows in the groove cut by the knife and the rear end of the bar 95 is prevented from sliding back by the tumbling catch 97, as shown in Fig. 22, the tumbling catch being pressed against the end of the bar 95 by the spring 98. When the knife cuts too deeply and scratches the foundation of the fabric and when the knife jumps out of its race, the finger 96 catches the traveling fabric 2, and the fabric overcomes the pull of the spring 98 and releases the bar 95 from the catch 97. The long spiral spring 99 then draws back the bar 95 and the vertical arm 100, secured to the rear end of the bar, is brought in contact with the cord 101, attached to the rod 51 (shown in Figs. 20, 8, and 11) sidewise, and permits the pawl 52 to drop into gear with the ratchet-wheel 60, which sets the stop-rod mechanism in motion, as hereinbefore described, and stops the machine. If the knife 7 pierces the fabric, which sometimes happens, the link 93 is turned on its pivot until the knife assumes a vertical position. In doing this the link 93 strikes the end of the bar 95 and overcomes the spring 98. The bar 95 is then retracted and is caused to act on the cord 101 to stop the machine, as hereinbefore described. A short arm 102 is attached to the end of the arm 8 and bears on the fabric 2. This relieves the knife 7 from the weight of the arm 8; but in order that a proper tension may be placed on the knife a flat spring 103 is provided and presses the knife downward toward the fabric, thereby giving the knife the required rigidity when cutting.

Our improvements for assisting the fabric from the front to the back of the machine are shown in Figs. 8 and 9, where 87 is a stationary inclined scray, and 88 is a board upon which the fabric drops after the cord has been cut. The inclined board 88 is connected to one end of the bell-crank levers 89, made to oscillate upon the fulcrum or shaft 90 by the connecting-rod 91, attached to the revolving face-plate 92, so that as the latter revolves an oscillating motion is given to the inclined board 88, which strikes the fabric and assists it from the front to the back of the machine, as will be readily understood.

We claim as our invention—

1. In a pile-cutting machine, the combination, with the back rail, of a series of movable plates carried by the back rail and adapted to increase the tension of those portions of the fabric being operated on by the knives.

2. In a pile-cutting machine, the combination, with the back rail, of a series of plates carried by the back rail and a screw having threads of different pitches at different parts of its length and adapted to move the said plates longitudinally of the back rail, substantially as and for the purpose set forth.

3. In a pile-cutting machine, the combination, with the back rail and the movable plates carried by it, of a series of knives arranged opposite the said plates, a series of tension-belts carried by pulleys and also arranged opposite the said plates, and means, such as screws having threads of different pitches at different parts of their length, for moving the said plates, knives, and tension-belts simultaneously and in a similar ratio, substantially as set forth.

4. In a pile-cutting machine, the combination, with the cross-rail at the feeding end of the machine, of the two guide-brackets, one of which is secured to the said rail, a saddle for moving the other bracket along the cross-rail, and means, such as a screw, for traversing the said saddle, substantially as and for the purpose set forth.

5. In a pile-cutting machine, the combination, with the back rail, of the pivoted arms 54, normally pressing the fabric on the back rail and adapted to be operated by a thickened portion of the fabric-stopping mechanism, substantially as set forth, the pawl 52, adapted to set in motion the stopping mechanism, the horizontal arm 51, normally supporting the said pawl, and operative connections between the arm 51 and the said pivoted arms, substantially as and for the purpose set forth.

6. In a pile-cutting machine, the combination, with the tension-roller 6, provided with a brake-wheel, and the roller 4, also provided with a brake-wheel and driven by the fabric, of a belt-pulley for driving the roller 6, a spring-actuated belt-shifter adapted to remove the driving-belt from the said pulley, a pivoted lever normally preventing the belt-shifter from moving the belt, two brake-straps encircling the two said brake-wheels, and operative connections between the brake-straps and the said lever, whereby both brakes may be applied simultaneously with the shifting of the belt to stop the machine, substantially as set forth.

7. In a pile-cutting machine, the combination, with the tension-roller 6, provided with a brake-wheel, and the roller 4, also provided with a brake-wheel and driven by the fabric, of a belt-pulley for driving the roller 6, a spring-actuated belt-shifter adapted to remove the driving-belt from the said pulley, the pivoted lever 46, normally preventing the belt-shifter from moving the belt, the brake-strap connected to lever 46 for stopping the roller 6, the pivoted lever 71, the brake-strap connected to lever 71 for stopping the roller 4, the rod 73, connecting the levers 46 and 71, the spring-actuated lever 53, provided with the pawl 52, the catch 47, and latch 48 for supporting the lever 53, the revolving ratchet-wheel 60, and the horizontal lever 51, normally holding the said pawl from engaging with the said ratchet-wheel, substantially as and for the purpose set forth.

8. In a pile-cutting machine, the combination, with the two spring-actuated brake mechanisms and the operating-levers 46 and 71, connected to the tension-roller 6 and to the roller 4, respectively, of the slotted rod connecting the said levers together, whereby the brakes are applied simultaneously and the tension-roller brake is released in advance of the second said brake to take up the slack in the fabric, substantially as set forth.

9. In a pile-cutting machine, the combination, with the sliding rail 35 at the rear of the machine and the rack 77, secured to it, of the guides 34, arranged on each side of the fabric and connected to the said rail, and a stationary revoluble pinion gearing into the said rack, whereby the fabric may be moved laterally, substantially as set forth.

10. In a pile-cutting machine, the combination, with the roller 4, driven by the fabric, and a clutch device secured to the shaft of the said roller, of the tension-roller 6, provided with a driving-belt pulley, a wheel journaled on the shaft of the roller 4 and adapted to engage with the said clutch device and arrest the motion of the roller when the said roller runs too fast, and intermediate driving devices connecting the said wheel with the tension-roller and adapted to drive the said wheel at the normal speed of the said roller 4, substantially as set forth.

11. In a pile-cutting machine, the combination, with the roller 4, driven by the fabric, of the wheel 82, journaled on the shaft of the said roller and provided with the flange 83, the boss provided with recesses and secured on the said shaft, the grooved gripping-plates carried by the said recesses and adapted to engage with the said flange, and the springs for holding the said plates and permitting them to grip the flange when the speed of the roll exceeds the speed of the said wheel, substantially as set forth.

12. In a pile-cutting machine, the combination, with the pivoted arm 8 and the knife supported thereby, of the retractible bar 95, provided with the pointed finger 96 and adapted to actuate the stop mechanism when pulled back, and a spring-actuated tumbling-catch adapted to prevent the said bar from sliding back until the said finger is engaged by the fabric, substantially as set forth.

13. In a pile-cutting machine, the combination, with the stationary inclined scray, of the oscillating inclined board 88 for assisting the return of the fabric, substantially as set forth.

14. In a pile-cutting machine, the combination, with the stationary inclined scray, of the inclined board 88 and the pivoted bell-crank lever and connecting-rod for oscillating the said board, and thereby assisting the return of the fabric, substantially as set forth.

In testimony whereof we affix our signatures in presence of two witnesses.

CHARLES WILLIAM KEIGHLEY.
  THOMAS BURNUP KEIGHLEY.
  WILLIAM NETHERWOOD.

Witnesses:
 ARTHUR B. CROSSLEY,
  *Commercial Street, Halifax,*
 ERNEST P. NEWTON,
  *Moorfield Villa, Halifax.*